United States Patent [19]

Kuo

[11] Patent Number: 5,677,711

[45] Date of Patent: Oct. 14, 1997

[54] TOUCH CONTROL TYPE CURSOR CONTROL DEVICE

[75] Inventor: Chunn Cherh Kuo, Taipei Hsien, Taiwan

[73] Assignee: Silitek Corporation, Taipei, Taiwan

[21] Appl. No.: 581,933

[22] Filed: Jan. 2, 1996

[51] Int. Cl.$^6$ ................................................. G09G 5/00
[52] U.S. Cl. ........................ 345/173; 178/18; 361/683
[58] Field of Search ............................. 345/173, 174, 345/175, 176, 177, 178; 178/18, 19; 364/708.1; 361/681, 683

[56] References Cited

U.S. PATENT DOCUMENTS 5,404,267  4/1995  Silva et al. ............................. 361/683
5,511,983  4/1996  Kashii et al. .......................... 434/365

*Primary Examiner*—Kee M. Tung
*Assistant Examiner*—Matthew Luu
*Attorney, Agent, or Firm*—Browdy and Neimark

[57] ABSTRACT

A touch control type cursor control device which includes a bottom shell covered with a cover frame to hold a circuit board, a digitizer mounted within the cover frame and connected to the circuit board, a left key switch and a right key switch mounted on the bottom shell and disposed at two opposite lateral sides relative to the digitizer and connected to the circuit board, a front left key switch and a front right key switch disposed in front of the digitizer and connected to the circuit board, and a connecting line extending from the circuit board for connection to the computer system.

3 Claims, 12 Drawing Sheets

TOUCH CONTROL TYPE CURSOR CONTROL DEVICE

BACKGROUND OF THE INVENTION

The present invention relates to cursor control devices, and relates more particularly to a touch control type cursor control device.

FIG. 12 shows a touch control type cursor control device according to the prior art. This structure of touch control type cursor control device comprises a casing to hold a digitizer and two key switches in front of the digitizer. Because the key switches are disposed in front of the digitizer, the hand must be constantly maintained in a particular posture relative to the digitizer and the key switches so that the digitizer and the key switches can be operated. Because the key switches are closely arranged together, it is not comfortable to operate the key switches and the digitizer with the same hand. This arrangement forces the operator to sit in a particular posture, therefore the operator will tire very soon.

SUMMARY OF THE INVENTION

The present invention has been accomplished to provide a touch control type cursor control device which eliminates the aforesaid drawbacks. The touch control type cursor control device of the present invention allows the operator to operate with either the left hand or the right hand in a comfortable manner. According to the present invention, the touch control type cursor control device comprises a bottom shell, a circuit board fixedly mounted on the bottom shell, a digitizer supported on upright supports on the bottom shell above the circuit board and electrically connected to the circuit board, a left key switch and a right key switch respectively pivoted to the upright supports and electrically connected to the circuit board and disposed at two opposite sides of the digitizer, a front left key switch and a front right key switch respectively mounted on the bottom shell in front of the digitizer between the left key switch and the right key switch and electrically connected to the circuit board, a connecting line extending from the circuit board out of the bottom shell for connection to a computer system, and a cover frame covered on the bottom shell to hold down the digitizer.

DETAILED DESCRIPTION OF THE PREFERRED EMBODIMENT

Figure 1:
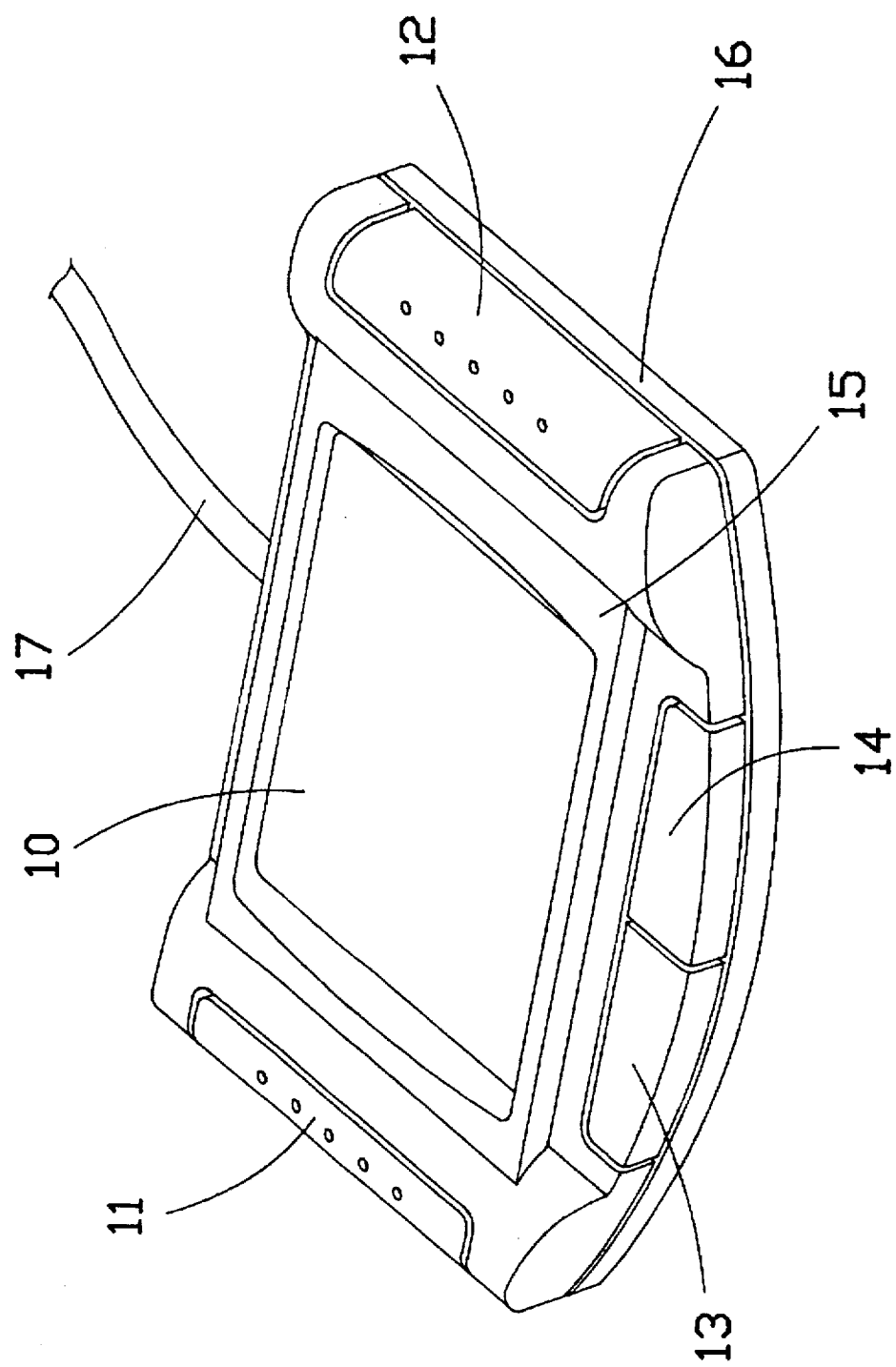
FIG. 1 is an elevational view of a touch control type cursor control device according to the present invention.

Referring to FIG. 1, a touch control type cursor control device in accordance with the present invention is generally comprised of a digitizer 10, a left key 11, a right key 12, a front left key 13, a front right key 14, a cover frame 15, a bottom shell 16, and a connecting line 17. The cover frame 15 and the bottom shell 16 are fastened together to provide a housing for housing the digitizer 10 and the keys 11, 12, 13, and 14. The front side of the bottom shell 16 smoothly curves forwards. The digitizer 10 is mounted within the cover frame 15. The left key 11 and the right key 12 are respectively mounted on two opposite ends of the bottom shell 16 and closely attached to two opposite ends of the cover frame 15, each having a substantially arched cross section. The front left key 13 and the front right key 14 are mounted on the bottom shell 16 near the front side. The front sides of the front left key 13 and the front right key 14 are disposed in a flush manner with smoothly curved front side of the bottom shell 16. Furthermore, cover frame 15 covers on a part of each of the keys 11, 12, 13, and 14. The connecting line 17 extends out of the rear side of the bottom shell 16 for transmission of electric signal.

Figure 2:
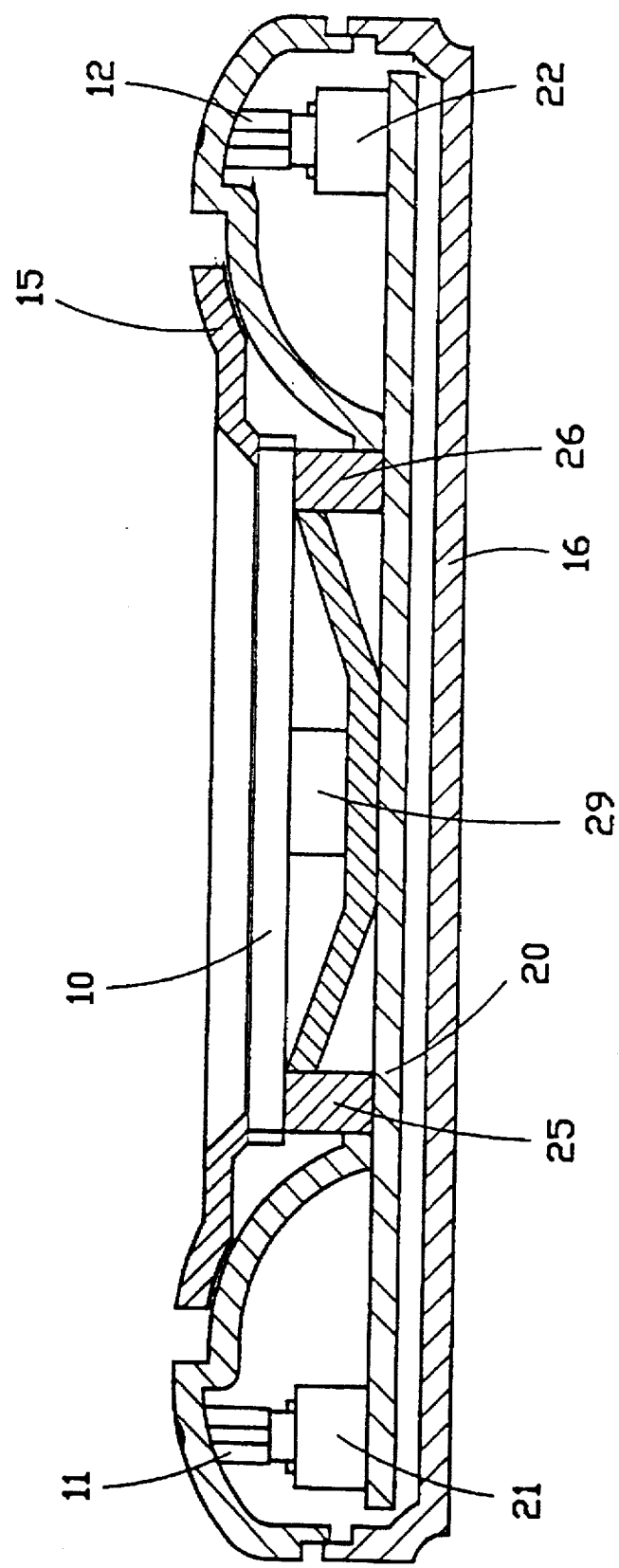
FIG. 2 is a front view in section of the touch control type cursor control device shown in FIG. 1.

Referring to FIG. 2, the digitizer 10 is mounted within the cover frame 15 and supported on two supports 25 and 26. The left key 11 and the right key 12 are respectively pivoted to the supports 25 and 26, and stopped above a respective switch 21 or 22. The switches 21 and 22 are connected to a circuit board 20 by an electric wiring 29. The circuit board 20 is fixedly secured to the bottom shell 16 beneath the digitizer 10.

Figure 3:
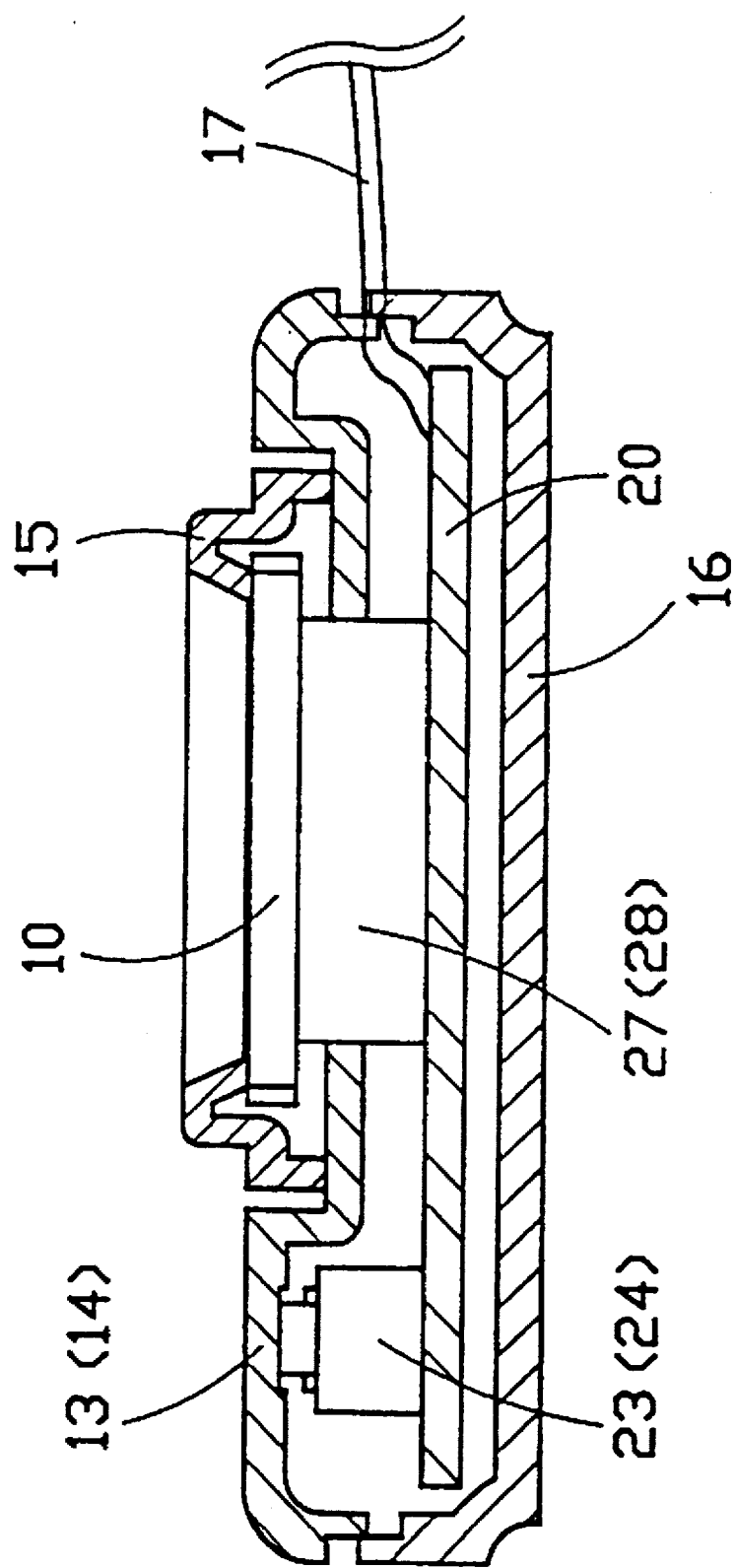
FIG. 3 is a side view in section of the touch control type cursor control device shown in FIG. 1.

Referring to FIG. 3, the key 13 or 14 has an inner side pivoted to the support 27 or 28, and an outer side covered on the front side of the bottom shell 16. The switch 23 or 24 is stopped below the key 13 or 14, and connected to the circuit board 25, which is fixed to the bottom shell 16.

Referring to FIGS. 1, 2, and 3 again, the finger is moved on the digitizer 10, the digitizer 10 is induced by the finger to provide an electric signal corresponding to the amount and direction of the movement of the finger on the digitizer 10. The signal from the digitizer 10 is transmitted to the circuit board 20 through the electric wiring 29, and then transmitted to the computer system through the connecting line 17 to move the cursor in the screen of the monitor of the computer system. When the cursor is moved to the desired position for the selection of an item from the menu shown in the screen, the key 11, 12, 13, or 14 is depressed to enter the selection. When the key 11, 12, 13, or 14 is depressed, the respective switch 21, 22, 23, or 24 is triggered to provide a signal to the circuit board 20, and then to the computer system through the connecting line 17.

Figure 4:
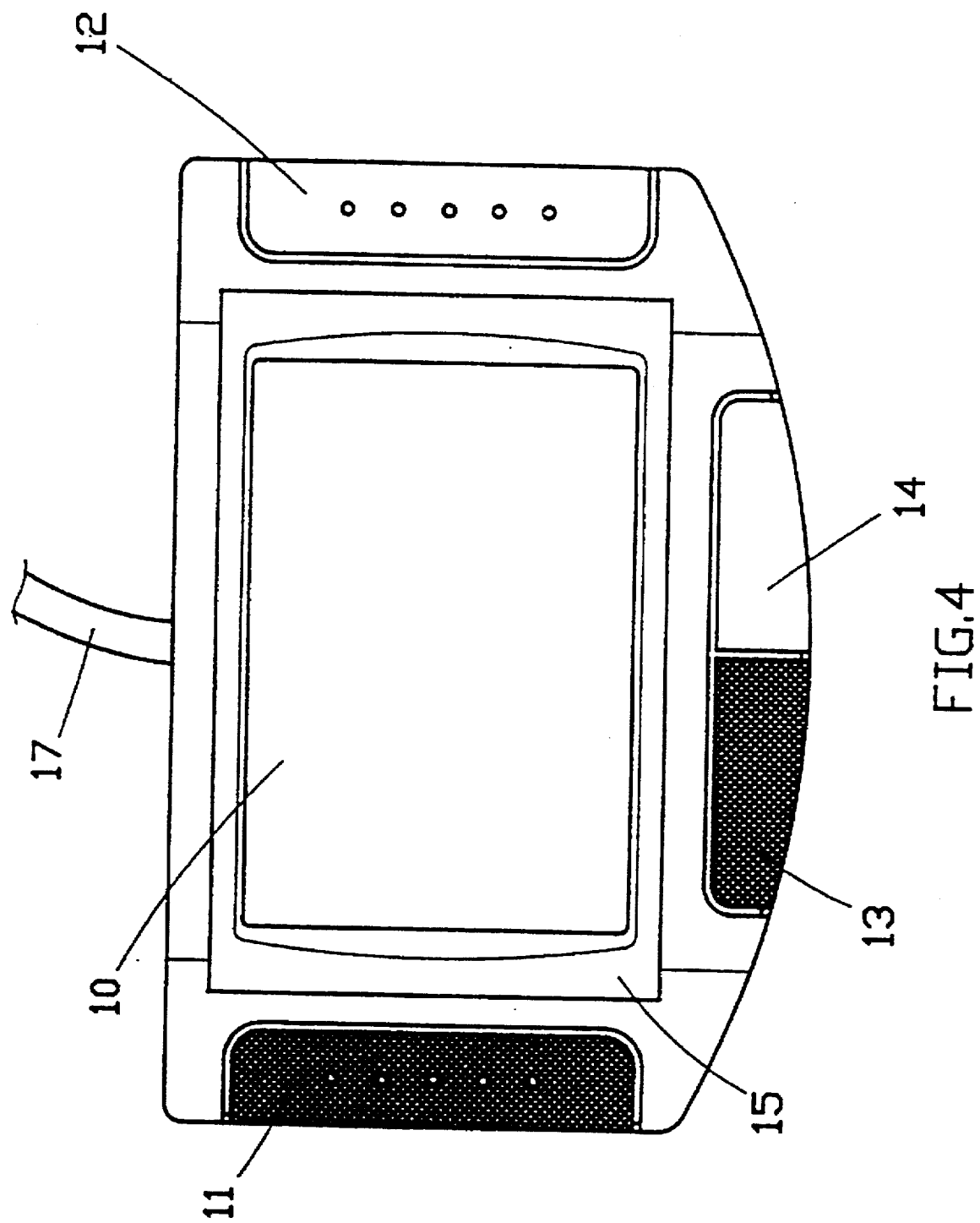
FIG. 4 shows the left key and the front left key designated as master keys, the right key and the front right key designated as auxiliary keys according to the present invention.
Figure 5:
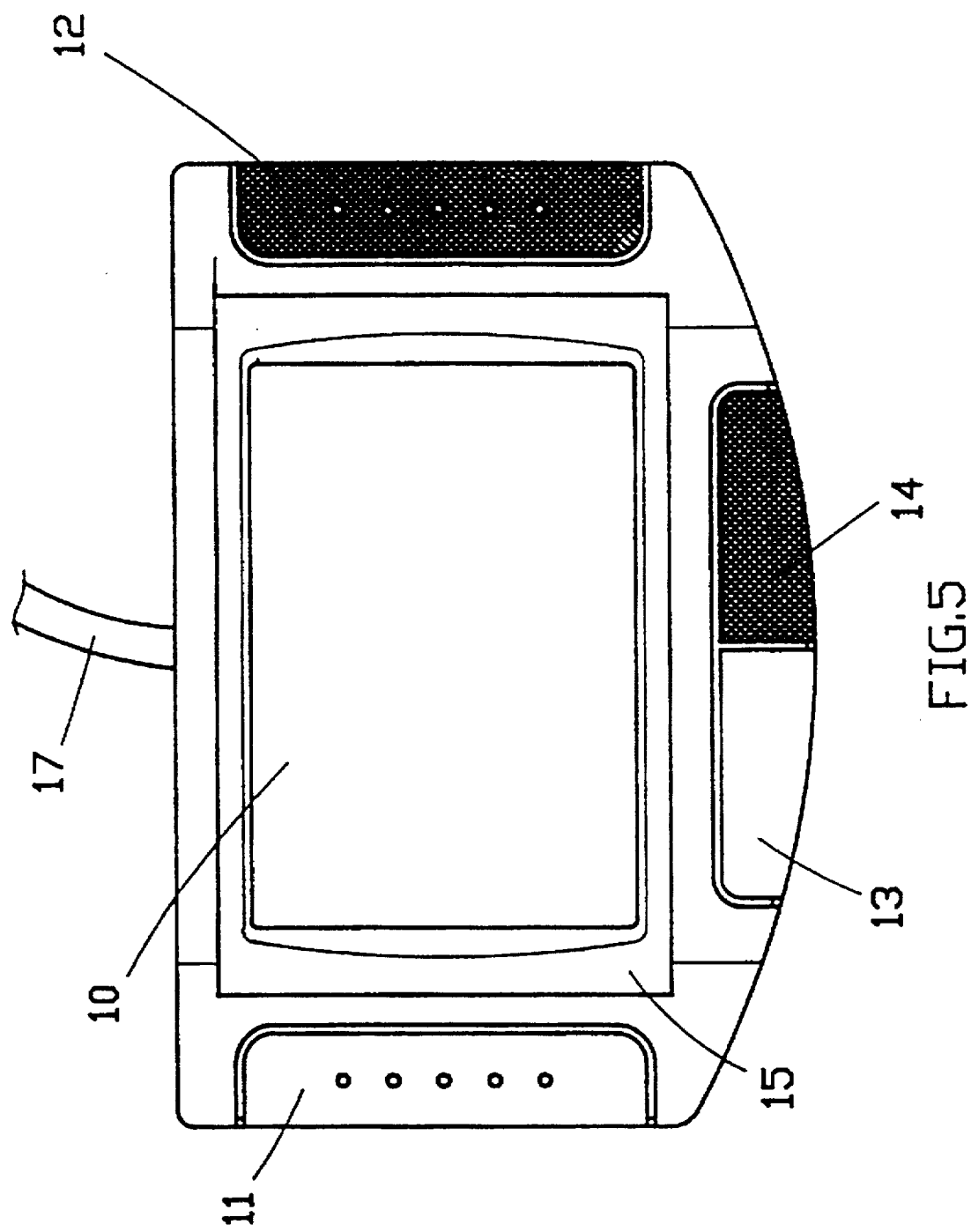
FIG. 5 shows the right key and the front right key designated as master keys, the left key and the left right key designated as auxiliary keys according to the present invention.

When installed, the left key 11 and the front left key 13 can be set by the computer software as master keys, the right key 12 and the front right key 14 can be set as auxiliary keys (see FIG. 4). Alternatively, the right key 12 and the front right key 14 can be set as master keys, the left key 11 and the front left key 13 can be set as auxiliary keys (see FIG. 5).

Figure 6:
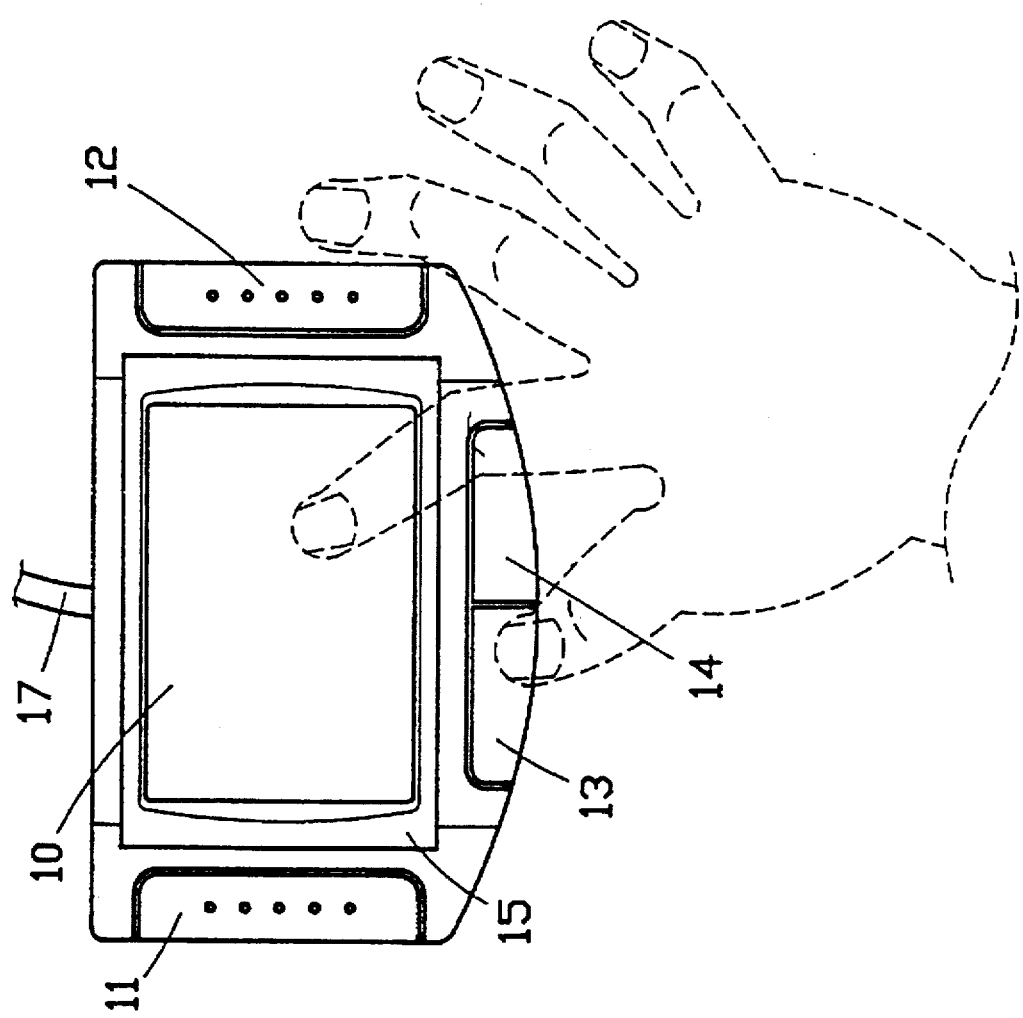
FIG. 6 shows the digitizer and the front left key respectively operated by the forefinger and thumb of the right hand according to the present invention.
Figure 7:
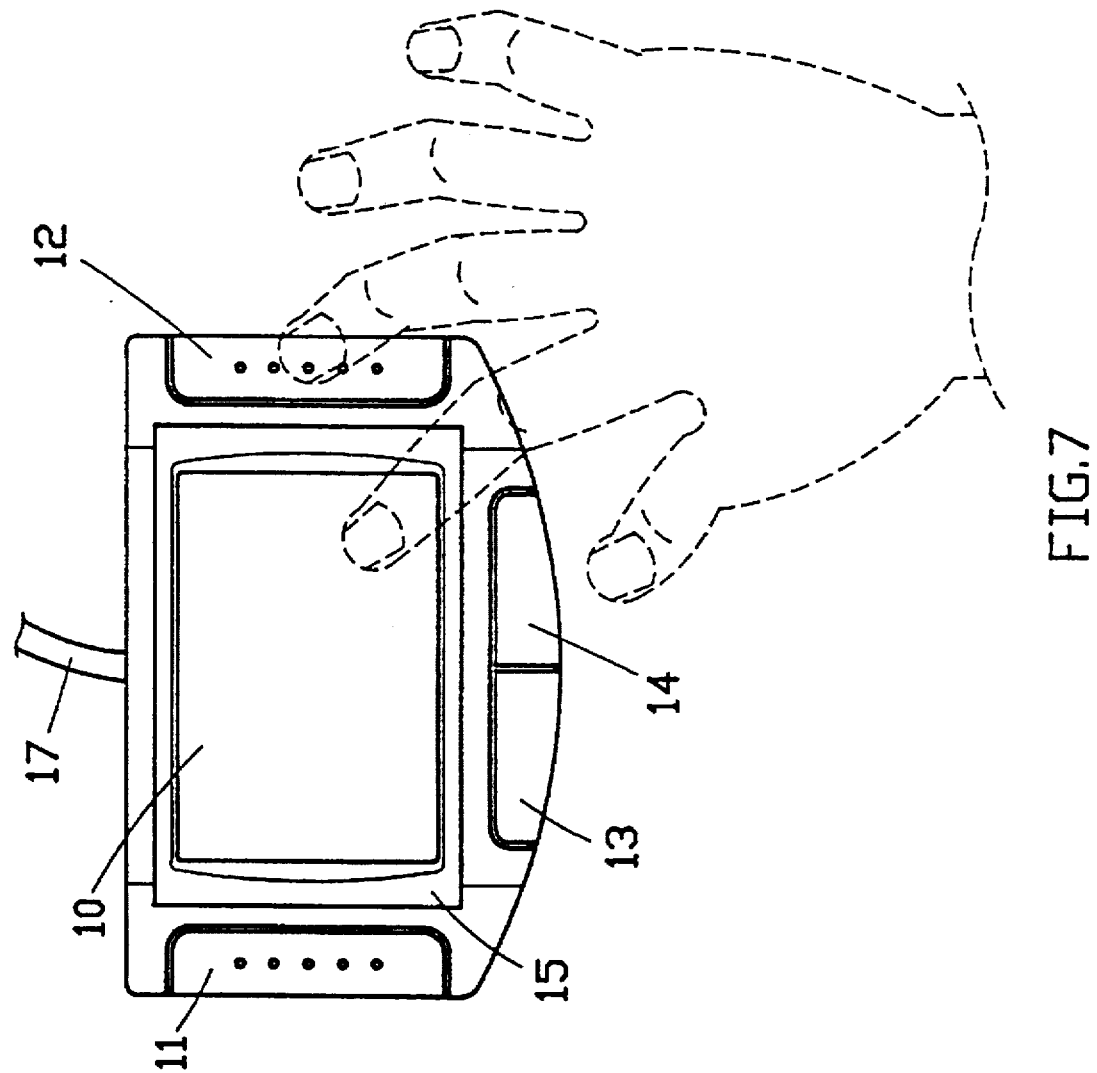
FIG. 7 shows the digitizer and the right key respectively operated by the forefinger and middle finger of the right hand according to the present invention.
Figure 8:
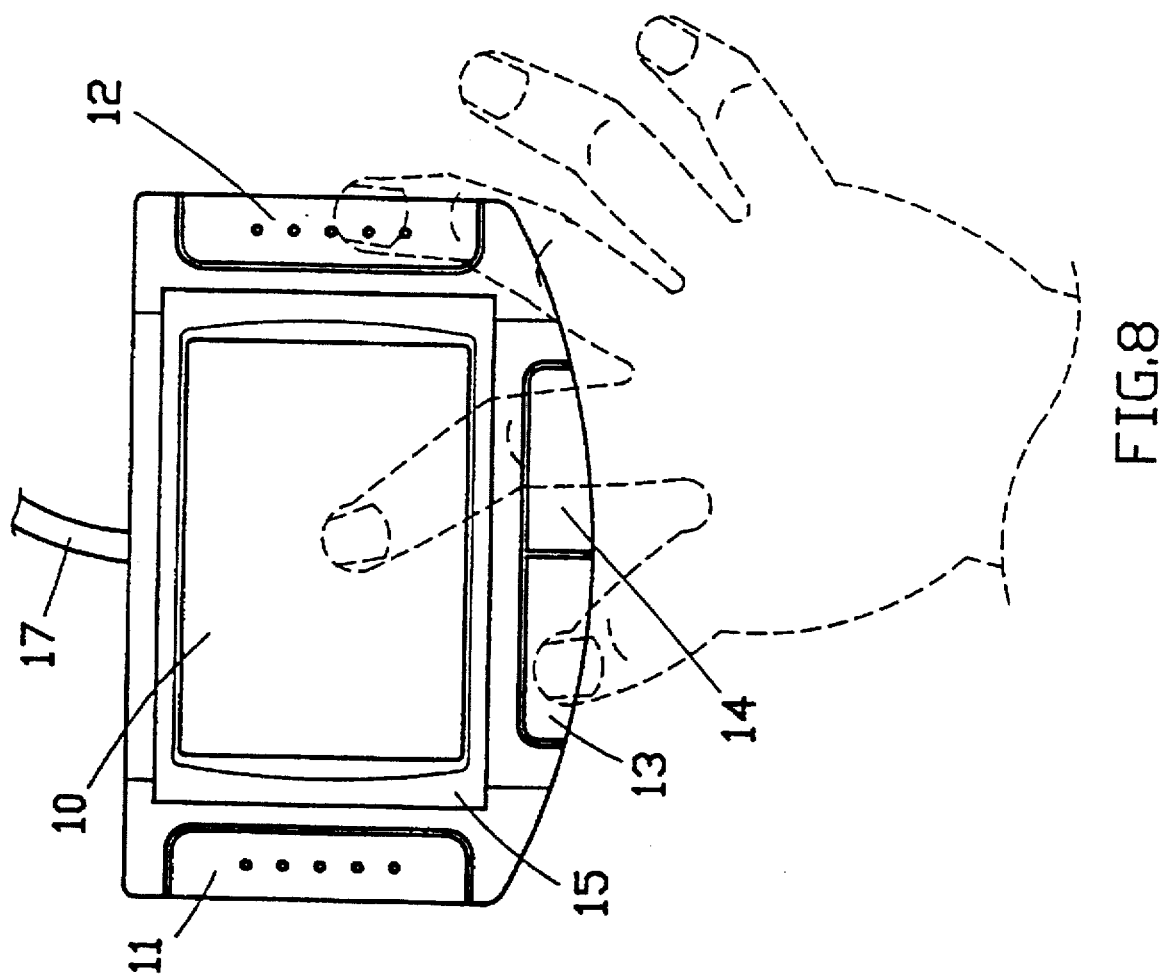
FIG. 8 shows the digitizer, the front left key, and the right key respectively operated by the forefinger, thumb, and middle finger of the right hand according to the present invention.

Referring to FIGS. 6, 7, and 8, when the left key 11 and the front left key 13 are set as master keys, the digitizer 10 can be operated by the forefinger of the right hand, and at the same time the thumb of the right hand can operate the left key 11 or the front left key 13 when the master key function is required (see FIG. 6), the middle finger of the right hand can operate the right key 12 or the thumb of the right hand can operate the front right key 14 when the auxiliary key function is required (see FIG. 7), the thumb of the right hand can operate the left key 11 or the front left key 13 and the middle finger of the right hand can operate the right key 12 or the front right key 14 when both the master key function and the auxiliary key function are required (see FIG. 8).

Figure 9:
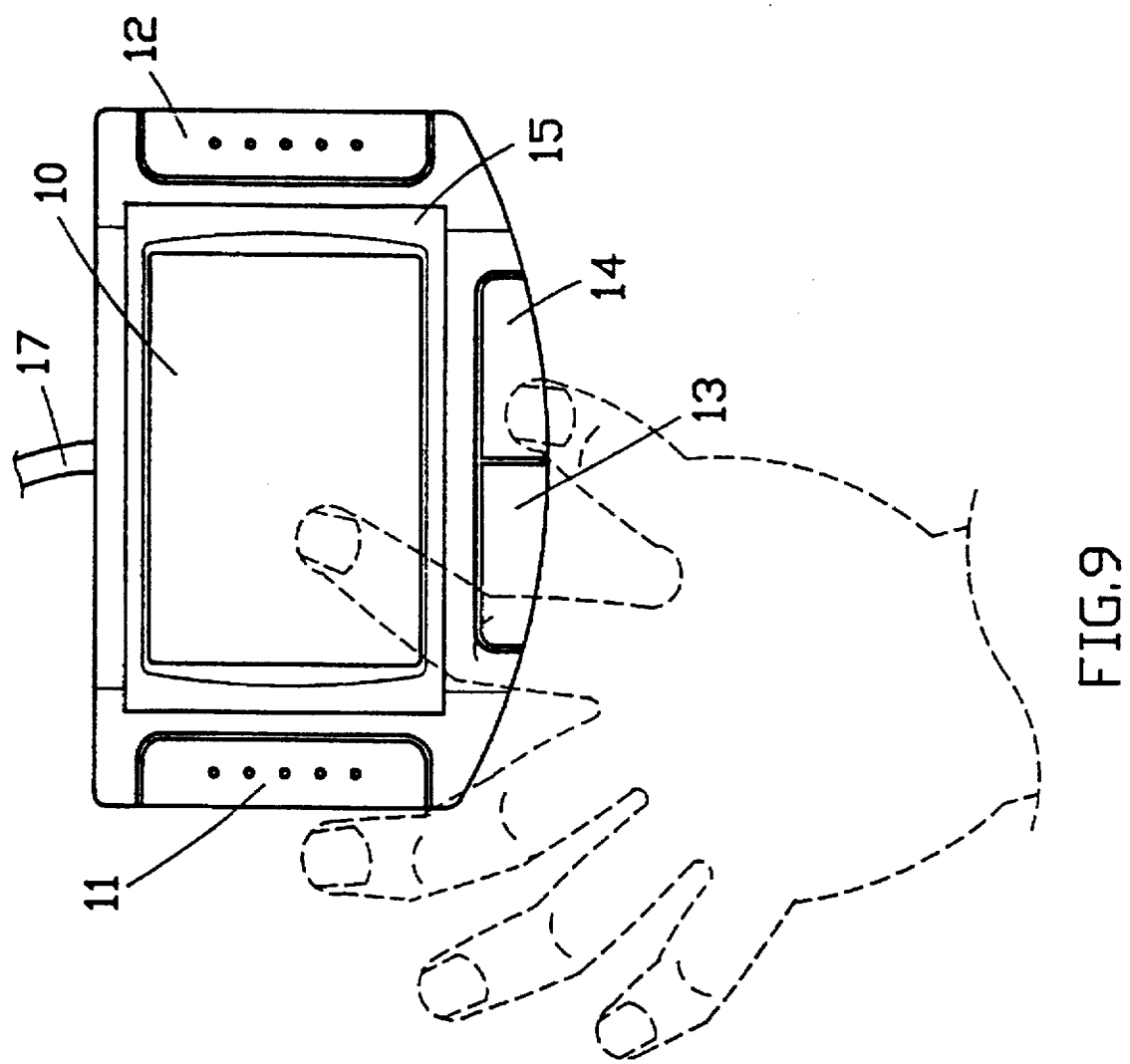
FIG. 9 shows the digitizer and the front right key respectively operated by the forefinger and thumb of the left hand according to the present invention.
Figure 10:
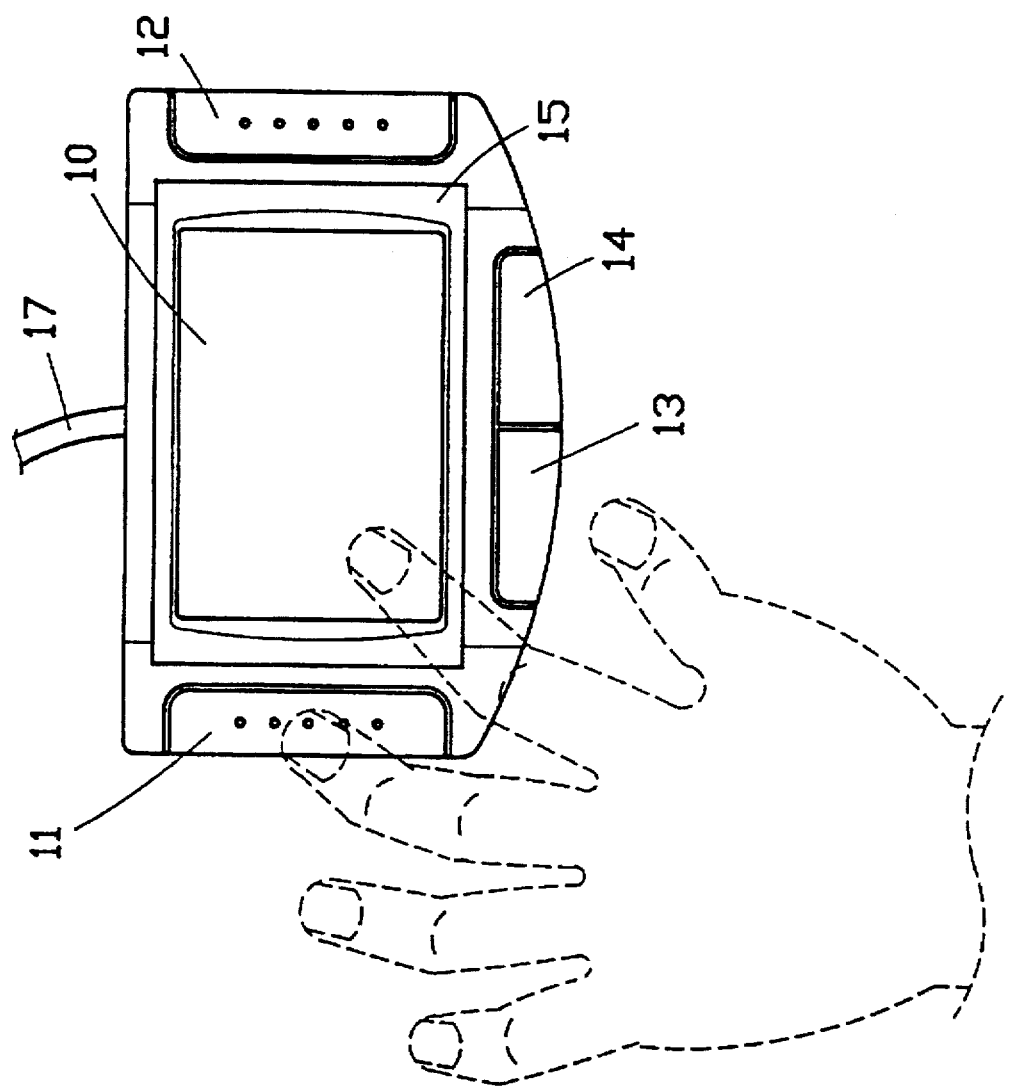
FIG. 10 shows the digitizer and the left key respectively operated by the forefinger and middle finger of the left hand according to the present invention.
Figure 11:
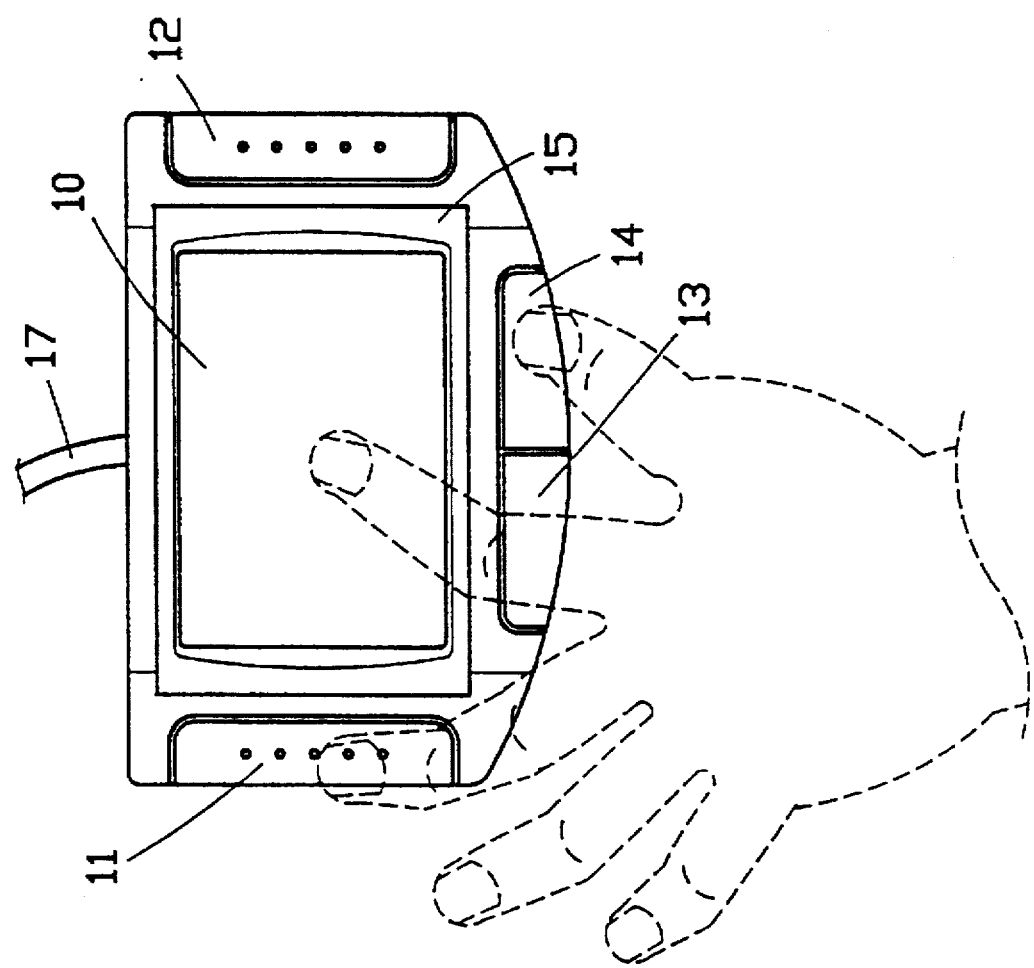
FIG. 11 shows the digitizer, the left key, and the front right key respectively operated by the forefinger, middle finger, and thumb of the left hand according to the present invention.
Figure 12:
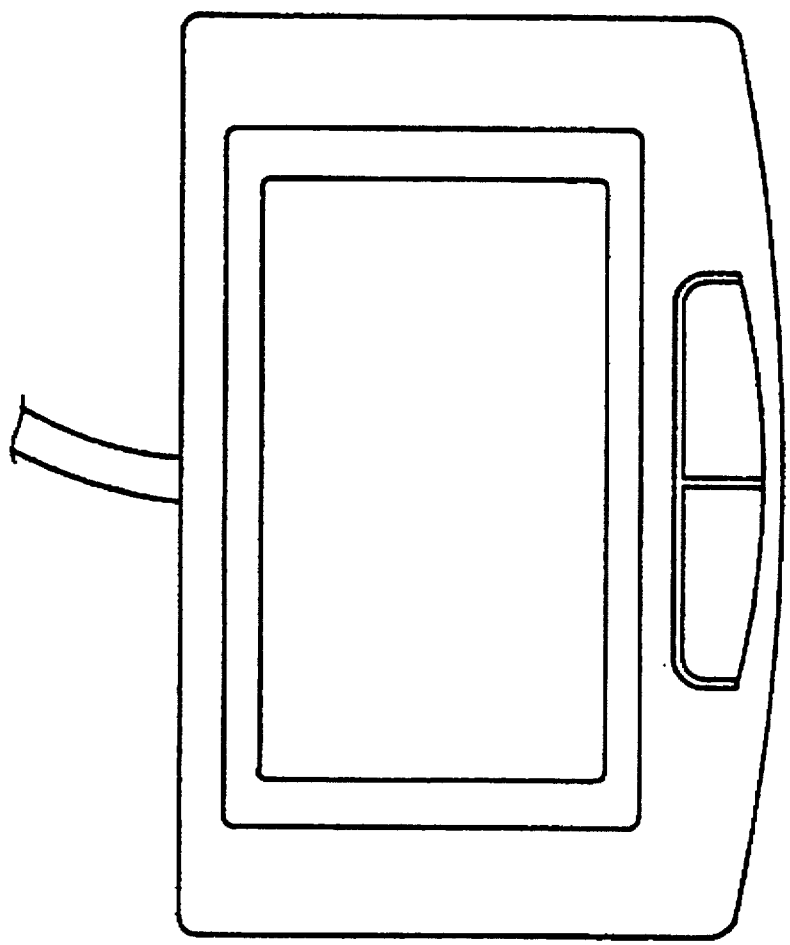
FIG. 12 shows a touch control type cursor control device according to the prior art.

Referring to FIGS. 9, 10, and 11, when the right key 11 and the front right key 14 are set as master keys, the digitizer 10 can be operated by the forefinger of the left hand, and at the same time the thumb of the left hand can operate the right key 12 or the front right key 14 when the master key function is required (see FIG. 9), the middle finger of the left hand can operate the left key 11 or the thumb of the left hand can operate the front left key 13 when the auxiliary key function is required (see FIG. 10), the thumb of the left hand can operate the right key 12 or the front right key 14 and the middle finger of the left hand can operate the left key 11 or the front left key 13 when both the master key function and the auxiliary key function are required (see FIG. 1).

As indicated, the touch control type cursor control device of the present invention can be comfortably operated by the left hand or the right hand, or by both the left hand and the right hand.

I claim:

1. A touch control type cursor control device comprising a bottom shell, a circuit board fixedly mounted on said bottom shell, a digitizer supported on upright supports on said bottom shell above said circuit board and electrically connected to said circuit board, a left key switch and a right key switch respectively pivoted to said upright supports and electrically connected to said circuit board and disposed at two opposite sides of said digitizer, a front left key switch and a front right key switch respectively mounted on said bottom shell in front of said digitizer between said left key switch and said right key switch and electrically connected to said circuit board, a connecting line extending from said circuit board out of said bottom shell for connection to a computer system, and a cover frame covered on said bottom shell to hold down said digitizer.

2. The touch control type cursor control device of claim 1 wherein said left key switch is electrically connected to said front left key switch, and said right key switch is electrically connected to said front right key switch.

3. The touch control type cursor control device of claim 1 wherein said cover frame covers on a part of each of said key switches.

* * * * *